Patented Mar. 11, 1941

2,234,269

UNITED STATES PATENT OFFICE 2,234,269

METHOD OF EXTRACTING SULPHUR

Dan McDonald, Santa Monica, Calif.

No Drawing. Application July 25, 1938,
Serial No. 221,191

10 Claims. (Cl. 23—228)

This invention relates to solvent extraction of sulphur from materials such as sulphur-bearing ores, sulphur-bearing residue from flue gases, etc.

It is the object of the invention to employ a solvent having a boiling point (at atmospheric pressure) at least as high as approximately the melting point of sulphur, whereby the sulphur-bearing material and the solvent may be heated to approximately the melting point of sulphur without boiling away the solvent; the solvent when heated to such temperature having a high solvent power for sulphur but resulting in substantially complete crystallization and separation of the sulphur when the solution is subsequently cooled to approximately atmospheric temperature, and the boiling point of the solvent (at atmospheric pressure) being not greatly in excess of the melting point of sulphur so that residual solvent may be distilled from the material from which sulphur has been extracted without employing excessive temperature or vacuum distillation, and may be recovered from the extracted sulphur by vacuum distillation without it being necessary to employ a high vacuum in order to so reduce the boiling point of the solvent that it may be distilled off without melting the sulphur.

Solvents heretofore employed, either do not have high solvent power for sulphur at temperatures which it is practical to employ (e. g. acetylene tetrachloride or aromatic compounds such as benzene or toluene), or have a boiling point appreciably lower than the temperature which is necessary for practical extraction of sulphur (e. g. carbon disulphide), or have such a high boiling point as to make it impractical to recover residual solvent by distillation (e. g. halogenated aromatic hydrocarbons such as monochloronaphthalene or trichlorobenzene).

I have found that perchlorethylene when employed as a solvent for extracting sulphur overcomes the disadvantages of solvents heretofore employed and provides efficient and economical extraction, in that: (1) perchlorethylene has a boiling point (at atmospheric pressure) higher than the melting point of sulphur, thereby permitting the sulphur-bearing material and the solvent being heated until all of the sulphur has melted without boiling the solvent, (2) perchlorethylene has high solvent power for sulphur at temperatures approximately that of the melting point of sulphur, with the melted sulphur completely miscible with the heated solvent but with substantially all of the sulphur crystallizing when the solution is subsequently cooled to approximately atmospheric temperature, and (3) perchlorethylene has a boiling point (at atmospheric pressure) which is only slightly higher than the melting point of sulphur, whereby residual solvent may be readily recovered by distillation.

Perchlorethylene is heated with the sulphur-bearing material in a suitable container, to approximately but preferably not to exceed the melting point of sulphur, i. e. 114.5° C., until all of the sulphur has melted. At a temperature of 114.5° C. the vapor pressure of perchlorethylene is less than 700 mm. of mercury, and consequently the solution may be heated at atmospheric pressure without boiling the solvent. At a temperature of approximately 114.5° C. perchlorethylene has high solvent power for sulphur, whereby substantially all of the sulphur in the sulphur-bearing material is readily dissolved.

The hot sulphur-bearing solution is then separated from the residual material from which sulphur has been extracted, preferably by decanting the solution; and the solution is then cooled for crystallizing the sulphur. The solution may be cooled to approximately atmospheric temperature, e. g. 25° C., by passing it through suitable cooling coils or if more rapid cooling is desired the hot solution may be agitated with a liquid cooling medium, such as water which may be at atmospheric or lower temperature. The cooled solution is collected in a suitable container and the sulphur crystallizes, forming in smaller crystals the more rapid the cooling. Thus, if extremely fine crystals are desired, the hot solution may be cooled by spraying it into and thus agitating it with water which has been lowered to a temperature approaching freezing.

Substantially all of the sulphur is crystallized by reducing the hot solution to approximately atmospheric temperature; and by allowing the cooled solution to then stand quiescent the crystallized sulphur readily separates from the supernatant liquid, which may then be removed by decanting. If indirect cooling has been employed, the liquid thus withdrawn is substantially pure perchlorethylene ready for reuse in the process; or if the hot solution has been cooled by direct contact with a cooling medium, the supernatant liquid which is withdrawn from the crystallized sulphur comprises both perchlorethylene and the cooling medium. The perchlorethylene is then separated from this cooling liquid, preferably by gravitational separation in the case of a cooling liquid such as water, whereupon the perchlorethylene is ready for reuse in the process and the separated water is also available for reuse as the cooling medium which is employed.

The residual material from which sulphur has been initially extracted and which has separated from the sulphur-bearing solution, may be subsequently treated with additional heated perchlorethylene for extracting last traces of sulphur, and/or may be washed with a suitable medium such as water, for removing solvent which still remains with the residual material. Such additional solvent and/or washing medium is withdrawn from the residual material and is cooled and separated from any sulphur which crystallizes out, and the solvent and washing medium are then separated from one another for recovery for reuse, the steps being the same as previously described.

Last traces of solvent may be recovered from the residual material from which sulphur has been extracted, preferably by distillation. For this purpose the residual material may be heated so as to vaporize last traces of solvent, with the solvent vapors then condensed for recovering the solvent condensate for reuse. It is practical to distil such last traces of solvent at atmospheric pressure, since the boiling point of perchlorethylene (at atmospheric pressure) is only 120° C.; or if desired the perchlorethylene may be distilled under partial vacuum for economy in heat consumption.

In similar manner, by distillation and condensation last traces of solvent are preferably recovered from the sulphur which has crystallized and which has been separated from residual liquid. This distillation is preferably under partial vacuum, so as to vaporize last traces of solvent at a temperature which will not remelt the sulphur; but since the boiling point of perchlorethylene (at atmospheric pressure) is only a few degrees above the melting point of sulphur, i. e. 120° C. as compared with 114.5° C., only a slight reduction in pressure from 760 mm. to 600 mm. of mercury, will cause the perchlorethylene to vaporize at approximately 110° C., i. e. at a temperature below the melting point of sulphur.

The use of perchlorethylene as a solvent for extracting sulphur thus provides high solvent efficiency at a temperature approximately that of the melting point of sulphur and without boiling away the solvent at such temperature, and with substantially complete crystallization of the sulphur upon cooling to approximately atmospheric pressure, and with last traces of solvent readily recovered by distillation which need only be at slightly reduced pressure in order to vaporize the solvent at a temperature below the melting point of sulphur.

I claim:

1. In extracting sulphur from sulphur-bearing material, the steps of: heating the material and perchlorethylene to at least the melting point of sulphur and until substantially all of the sulphur has melted, separating the resulting sulphur-bearing solution from residual material, agitating the solution with a cooling medium which is appreciably below atmospheric temperature so as to reduce the solution to approximately atmospheric temperature, separating the resulting crystallized sulphur from residual liquid, and distilling residual perchlorethylene from the crystallized sulphur under partial vacuum so as to vaporize the perchlorethylene at a temperature below the melting point of sulphur.

2. In extracting sulphur from sulphur-bearing material, the steps of: heating the material and perchlorethylene to at least the melting point of sulphur and until substantially all of the sulphur has melted, separating the resulting sulphur-bearing solution from residual material, cooling the solution so as to crystallize sulphur, and separating the crystallized sulphur from the perchlorethylene.

3. In extracting sulphur from sulphur-bearing material, the steps of: heating the material and perchlorethylene at temperature substantially not lower than the melting point of sulphur, separating the resulting sulphur-bearing solution from residual material, agitating the solution with a cooling medium which is appreciably below atmospheric temperature so as to reduce the solution to approximately atmospheric temperature, and separating the resulting crystallized sulphur from residual liquid.

4. In extracting sulphur from sulphur-bearing material, the steps of: heating the material and perchlorethylene at temperature substantially not lower than the melting point of sulphur, separating the resulting sulphur-bearing solution from residual material, cooling the solution so as to crystallize sulphur, separating the crystallized sulphur from the perchlorethylene, and distilling residual perchlorethylene from the crystallized sulphur under partial vacuum so as to vaporize the perchlorethylene at a temperature below the melting point of sulphur.

5. In extracting sulphur from sulphur-bearing material, the steps of: heating the material and perchlorethylene at temperature substantially not lower than the melting point of sulphur, separating the resulting sulphur-bearing solution from residual material, cooling the solution so as to crystallize sulphur, separating the crystallized sulphur from the perchlorethylene, and distilling residual perchlorethylene from the crystallized sulphur.

6. In extracting sulphur from sulphur-bearing material, the steps of: heating the material and perchlorethylene at temperature substantially not lower than the melting point of sulphur, separating the heated sulphur-solution from residual material, spraying the solution into a liquid cooling medium for crystallizing sulphur, and separating residual liquid from crystallized sulphur.

7. A process for recovering elemental sulphur from a sulphur-bearing material comprising contacting said material with perchlorethylene at a temperature substantially not lower than the melting point of sulphur.

8. In processing sulphur, contacting sulphur with perchlorethylene at temperature substantially not lower than the melting point of sulphur.

9. In processing sulphur, contacting sulphur with perchlorethylene at temperature substantially not lower than the melting point of sulphur, and depositing sulphur from the resulting sulphur solution.

10. In processing sulphur, contacting sulphur with perchlorethylene at temperature substantially not lower than the melting point of sulphur, and cooling and depositing sulphur from the resulting sulphur solution.

DAN McDONALD.